(12) United States Patent
Satoh

(10) Patent No.: US 8,251,531 B2
(45) Date of Patent: Aug. 28, 2012

(54) SUPPORTING UNIT, ILLUMINATING UNIT AND DISPLAY DEVICE

(75) Inventor: Tamotsu Satoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 261 days.

(21) Appl. No.: 12/739,963

(22) PCT Filed: Jun. 2, 2008

(86) PCT No.: PCT/JP2008/060139
§ 371 (c)(1),
(2), (4) Date: Apr. 27, 2010

(87) PCT Pub. No.: WO2009/057341
PCT Pub. Date: May 7, 2009

(65) Prior Publication Data
US 2010/0254118 A1 Oct. 7, 2010

(30) Foreign Application Priority Data
Oct. 31, 2007 (JP) ................................ 2007-282689

(51) Int. Cl.
*G09F 13/04* (2006.01)
(52) U.S. Cl. .................. 362/97.1; 362/217.02; 362/632; 362/633; 362/634

(58) Field of Classification Search ................. 362/97.1, 362/217.02, 287, 390, 402, 440, 444, 632–634
See application file for complete search history.

(56) References Cited

U.S. PATENT DOCUMENTS

| | | |
|---|---|---|
| 2004/0120161 A1 | 6/2004 | Hwang |
| 2006/0104083 A1 | 5/2006 | Kwon |
| 2007/0109767 A1 | 5/2007 | Han et al. |
| 2007/0242446 A1* | 10/2007 | Lee .................................. 362/29 |

FOREIGN PATENT DOCUMENTS

| | | |
|---|---|---|
| JP | 2004-200163 A | 7/2004 |
| JP | 2006-140160 A | 6/2006 |
| JP | 2007-128887 A | 5/2007 |
| JP | 2007-157450 A | 6/2007 |

OTHER PUBLICATIONS

Official Communication issued in International Patent Application No. PCT/JP2008/060139, mailed on Jun. 24, 2008.

* cited by examiner

*Primary Examiner* — Stephen F Husar
*Assistant Examiner* — Meghan Dunwiddie
(74) *Attorney, Agent, or Firm* — Keating & Bennett, LLP

(57) ABSTRACT

A lamp clip LC supporting a diffusion sheet 46 includes a support pin SP that is in contact with and thereby supports the diffusion sheet 46 and in at least a part of the support pin SP, a helical elastic member is included.

9 Claims, 10 Drawing Sheets

SUPPORTING UNIT, ILLUMINATING UNIT AND DISPLAY DEVICE

TECHNICAL FIELD

The present invention relates to a supporting unit that supports an optical sheet. Furthermore, the invention relates to an illuminating unit that includes the supporting unit, and to a display device (a liquid crystal display device and the like) that is provided with the illuminating unit.

BACKGROUND ART

Conventionally, in backlight units in liquid crystal display devices, a diffusion sheet (an optical sheet) that diffuses light from a light source is provided; furthermore, on that diffusion sheet, a lens sheet (an optical sheet) for enhancing light convergence is provided. As shown in FIG. 10, a diffusion sheet 146 and a lens sheet 147 are supported by a support portion (a support pin) sp of a lamp clip 1c that is fitted to a floor face 144B of a backlight chassis 144 (see Patent Document 1).

Incidentally, in such a backlight unit 149, a problem is caused by deformation of the resin-formed diffusion sheet 146 and the like due to heat from fluorescent tubes 142, in particular, deformation of the diffusion sheet 146 and the like dependent on heat or dissipated heat transmitted according to ON/OFF of the fluorescent tubes 142. The reason is that, when such deformation (bend) occurs, due to the bent diffusion sheet 146 and the like, a great force acts on the support portion sp of the lamp clip (a supporting unit) 1c.

In the backlight unit 149 in Patent Document 1, however, the lamp clip 1c includes a buffer portion 105. The buffer portion 105 buffers the force acted on the support portion sp which is pressed down due to the bent of the diffusion sheet 146 and the like Thus, the support portion sp and the diffusion sheet 146 are not in relatively strong contact.
Patent Document 1: JP-A-2007-128887 (see FIG. 3 and paragraph 0036)

DISCLOSURE OF THE INVENTION

Problems to be Solved by the Invention

However, there is no consistency in the way the diffusion sheet 146 bends. Thus, on the support portion sp of the lamp clip 1c, force acts from various directions. Then, with a case of the buffer portion 105 having an arch shape as disclosed in Patent Document 1, although the force acting along the extending direction of the support portion sp is efficiently buffered, it can hardly be said that the force acting from other directions are buffered sufficiently. Besides, if no sufficient buffering is realized, noise generation and the like attributable to the support portion sp making contact with the diffusion sheet 146 may disadvantageously result.

The present invention has been devised under the above background. An object of the invention is to provide a supporting unit and the like that can ward off, with the support pin, the force attributable to the optical sheet that bends in various directions.

Means for Solving the Problem

A supporting unit supports an optical sheet that refracts and advances received light to emit. To be specific, the supporting unit includes a support pin that is in contact with and thereby supports the optical sheet. In addition, in at least a part of the support pin, a helical elastic member is included.

Such an helically-extending elastic member has high flexibility compared with, for example, a simple plate-like elastic member. Thus, the helical elastic member not only wards off the force acting along its extending direction, but also wards off, for example, force acting from a side thereof. Thus, with a support pin including such a helical elastic member, even if the optical sheet bends in various directions, the two members (the support pin and the optical sheet) are not in strong contact. Thus, noise generation and the like attributable to contacting is less likely to be generated.

Desirably, the support pin of the supporting unit is increasingly narrow toward a tip. This reduces the area of a member being in contact with the optical sheet, and thus makes the member less notable from outside.

Since the helical elastic member has only to be included in at least a part of the support pin, there are various types of support pins. For example, the support pin may include other than the helical elastic member, a hold piece that supports the helical elastic member. To be specific, the support pin may be formed such that the helical elastic member is located in a front-end part of the support pin, and the hold piece is located in a rear-end part thereof.

In such a support pin, desirably, the helical elastic member is increasingly narrow toward a tip. Moreover, the support pin including the helical elastic member and the hold piece may be, as a whole, increasingly narrow toward a tip.

Moreover, the support pin may include other than the helical elastic member, a contact piece being in contact with the optical sheet while being supported by the helical elastic member. To be specific, the support pin may be formed such that the helical elastic member is located in a rear-end part of the support pin, and the contact piece is located in a front-end part thereof.

In such a support pin, desirably, the contact piece is increasingly narrow toward a tip. Moreover, the support pin including the contact piece and the helical elastic member may be, as a whole, increasingly narrow toward a tip.

The supporting unit has only to include at least the support pin, and it may include a clip piece grasping a linear light source that emits light.

Desirably, the supporting unit is formed of a white resin. This makes the supporting unit hard to be recognized visually from outside through the optical sheet.

An illuminating unit comprising: a linear light source such as a fluorescent tube; an optical sheet that receives light from the linear light source and then refracts and advances the light to emit; and the above-described supporting unit that supports the optical sheet can also be said to be the present invention.

Moreover, a display device comprising the above illuminating unit can also be said to be the present invention.

Advantages of the Invention

According to the present invention, in the supporting unit, the support pin that is in direct contact with the optical sheet has the helical elastic member of very high flexibility included therein. Thus, even if the optical sheet in a backlight unit bends in various directions, force (pressure) attributable to the bent does not act excessively on the support pin. As a result, the support pin and the optical sheet are not in strong contact, and thus no noise and the like is generated.

LIST OF REFERENCE SYMBOLS

Figure 1:
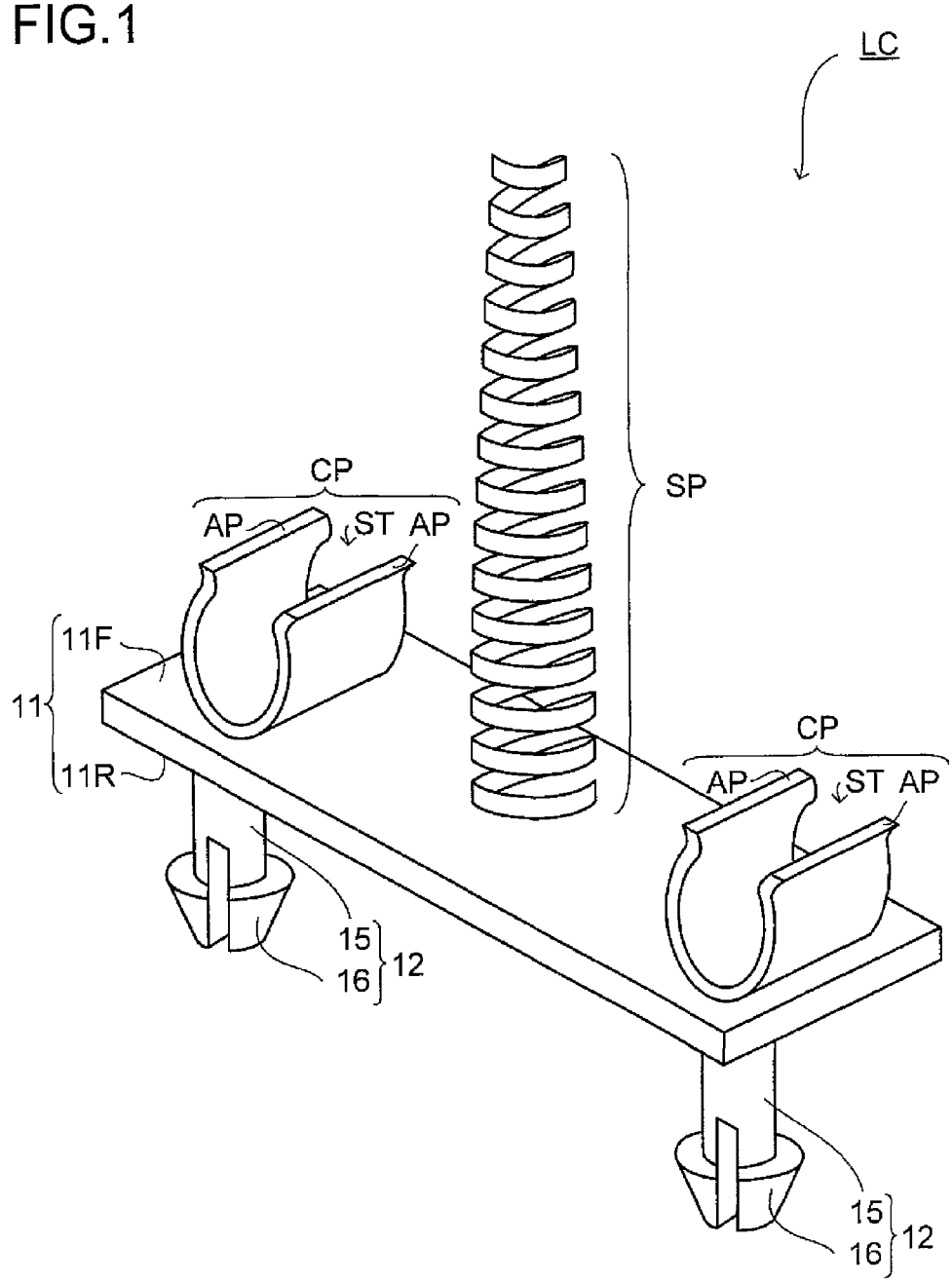
[FIG. 1] A perspective view of a lamp clip.

LC lamp clip (supporting unit)
11 base portion
12 engagement portion
15 project piece
16 catch piece
CP clip piece
SP support pin
39 liquid crystal display panel
42 fluorescent tube
43 lamp holder
44 backlight chassis
45 reflective sheet
46 diffusion sheet (optical sheet)
47 lens sheet (optical sheet)
49 backlight chassis
89 liquid crystal display device

BEST MODE FOR CARRYING OUT THE INVENTION

[First Embodiment]
A first embodiment of the present invention will be described below with reference to the relevant drawings. It should be noted that there may be a case where a reference numeral of a member or the like may be omitted for the sake of convenience, in which case another diagram will be referred to.

Figure 9:
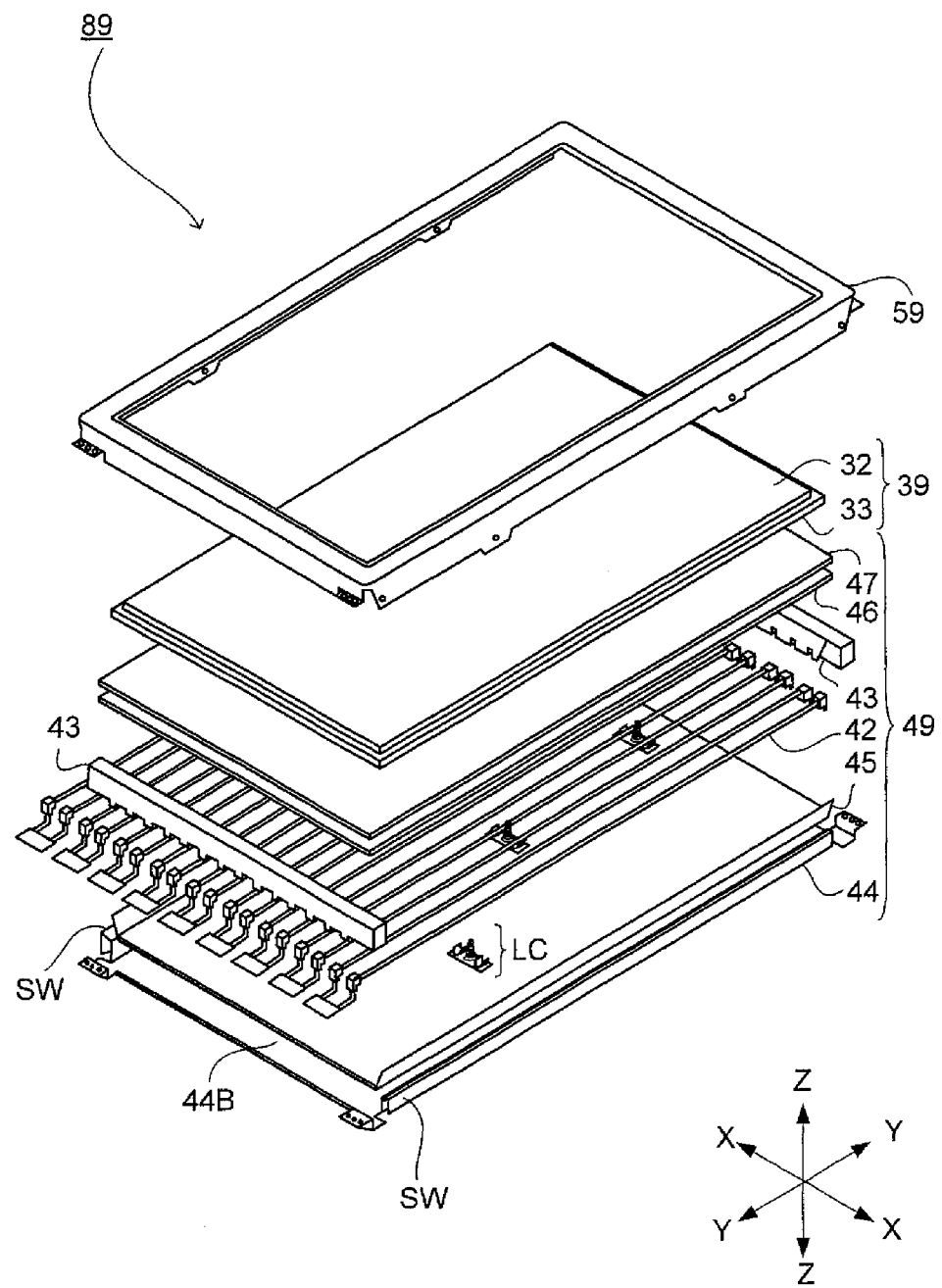
[FIG. 9] An exploded perspective view of a liquid crystal display device.
Figure 10:
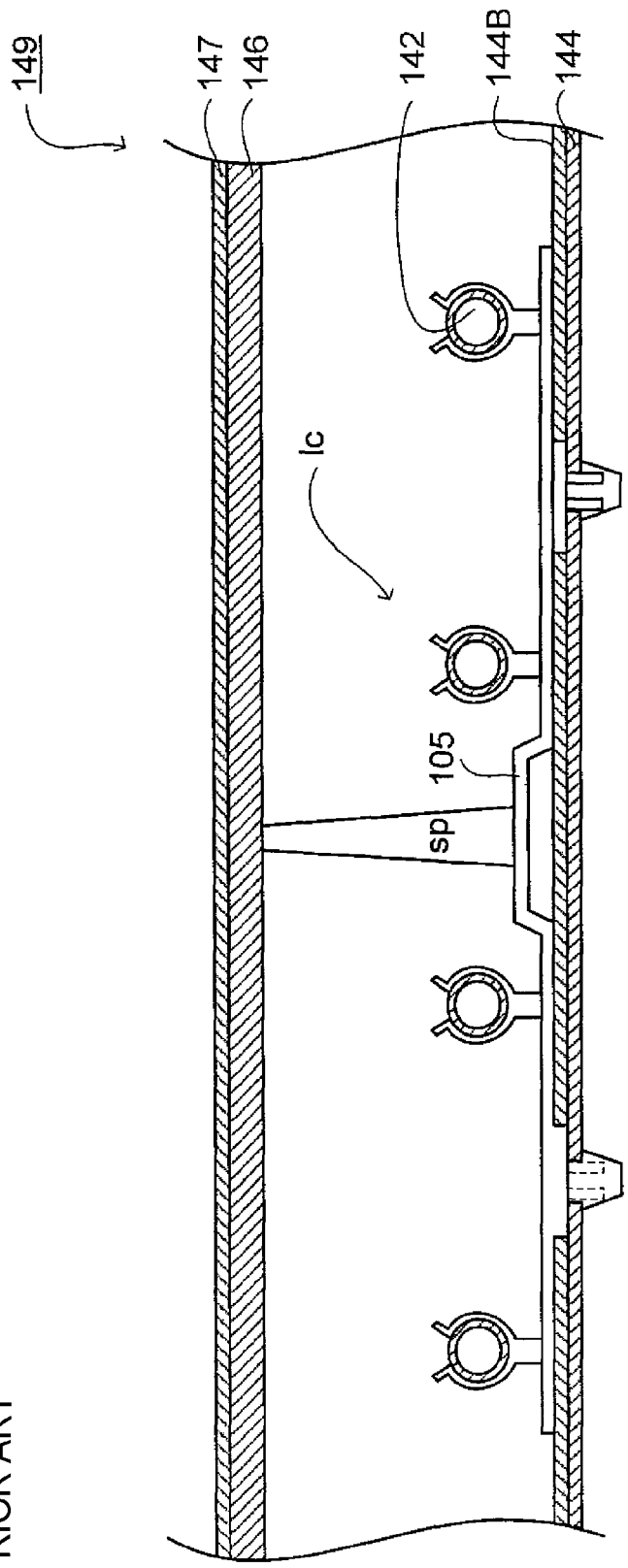
[FIG. 10] A sectional view of a conventional backlight unit.

FIG. 9 is an exploded perspective view of an example of a display device, namely a liquid crystal display device 89. As shown in this diagram, the liquid crystal display device 89 includes a liquid crystal display panel 39, a backlight unit (an illuminating unit) 49, and a bezel 59.

In the liquid crystal display panel 39, an active matrix substrate 32 that includes a switching device such as a TFT (Thin Film Transistor) and the like, and an opposing substrate 33 that opposes the active matrix substrate 32 are stuck together with a sealing material (not shown). In addition, a gap between the two substrates 32 and 33 is filled with liquid crystal (not shown).

The liquid crystal display panel 39 is a display panel of a non-luminous type, and therefore receives light (backlight) from the backlight unit 49 to thereby exert a display function. Thus, if the light from the backlight unit 49 irradiates the entire surface of the liquid crystal display panel 39 uniformly, the display quality of the liquid crystal display panel 39 improves.

In order to generate backlight, the backlight unit 49 includes a fluorescent tube (a light source) 42, lamp holders 43, a lamp clip (a supporting unit) LC, a backlight chassis 44, a reflective sheet (an optical sheet) 45, a diffusion sheet (an optical sheet) 46, and a lens sheet (an optical sheet) 47.

The fluorescent tube (the linear light source) 42 is a light source having a linear (bar-like, cylindrical, or the like) shape, and, as the fluorescent tube 42, a plurality of them are provided in the backlight unit 49 (note that, for the sake of convenience, only some of them are shown in the diagram).

The type of the fluorescent tube 42 is not limited; it may be, for example, a cold cathode tube or hot cathode tube. In the following description, the direction in which the fluorescent tubes 42 are arrayed (the direction in which the fluorescent tubes 42 are arrayed linearly) will be referred to as the X direction, the direction in which the fluorescent tubes 42 extend will be referred to as the Y direction, and the direction perpendicular to both the X and Y directions will be referred to as the Z direction. The light source may be an LED or the like (note that if the LED is adopted, no clip piece CP is required).

The lamp holders 43 are a pair of block-shaped members which hold the fluorescent tubes 42, the diffusion sheet 46, and the lens sheet 47. To be specific, the fluorescent tubes 42 are provided in the backlight unit 49 with the individual lamp holders 43 supporting one ends and the other ends of the fluorescent tubes 42. In addition, the diffusion sheet 46 and the lens sheet 47 are provided in the backlight unit 49 with those faces of the lamp holders 43 which face the liquid crystal display panel 39 supporting the diffusion sheet 46 and the lens sheet 47 being placed on the diffusion sheet 46.

The lamp clip LC includes a clip piece CP that grasps a fluorescent tube 42 and a support pin SP that supports an optical sheet such as the diffusion sheet 46 (details will be described later).

The backlight chassis 44 includes a floor face 44B and walls (opposing walls) SW and SW—standing on the floor face 44B to oppose one another—so as to be a housing member that houses various members such as the fluorescent tubes 42.

The reflective sheet 45 is a reflective member that covers the floor face 44B of the backlight chassis 44. In addition, the reflective sheet 45 reflects light from the fluorescent tubes 42 located in the backlight chassis 44. To be specific, the reflective sheet 45 reflects a part of radial light (light radiating from the fluorescent tubes 42) emitted from the fluorescent tubes 42 and leads it to an open face of the backlight chassis 44.

The diffusion sheet 46 is a member formed of resin that contains polyethylene terephthalate or the like having functions of dispersing and diffusing light. In addition, the diffusion sheet 46 is so located as to cover the fluorescent tubes 42 arrayed in parallel at the floor face 44B of the backlight chassis 44. As a result, when light that has advanced from the fluorescent tubes 42 enters the diffusion sheet 46, that light is dispersed and diffused so as to pervade in the in-plane direction.

The lens sheet 47 is a sheet having, for example, a lens shape in the sheet face thereof so as to bend (converge) the radiation characteristic of light, and is so located as to cover the diffusion sheet 46. Thus, when light that has advanced from the diffusion sheet 46 enters the lens sheet 47, that light converges and improves the light emission brightness per unit area.

The bezel 59 is an exterior for the liquid crystal display device 89, and is a member that sandwiches, together with the backlight chassis 44, the liquid crystal display panel 39 located on the backlight unit 49.

In the backlight unit 49 as described above, the fluorescent tubes 42 arrayed in parallel emit light in response to an AC signal fed from an inverter (not shown). The light reaches the diffusion sheet 46 directly, or is first reflected at the reflective sheet 45 and then reaches the diffusion sheet 46. Furthermore, the light that has reached the diffusion sheet 46 passes through the lens sheet 47 while being diffused and is thereby emitted as backlight with enhanced light emission brightness. This backlight then reaches the liquid crystal display panel 39, and the liquid crystal display panel 39 displays an image.

Figure 2:
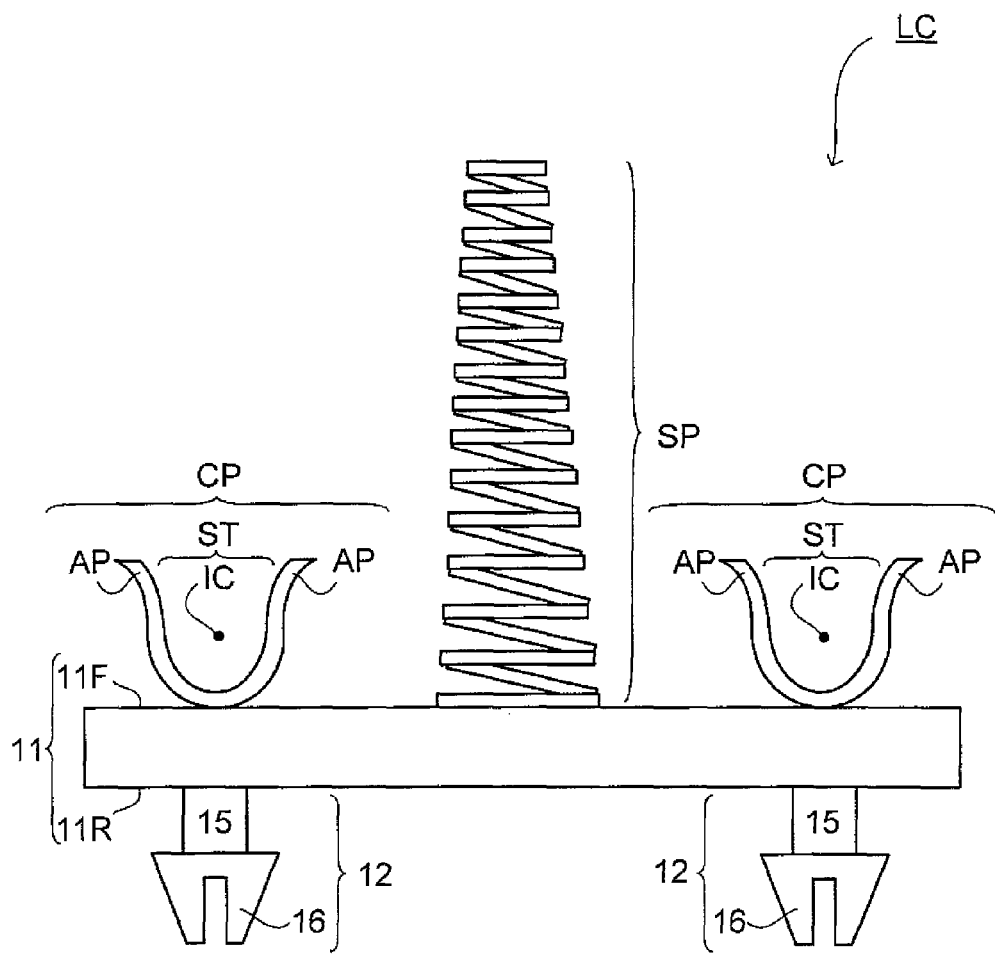
[FIG. 2] A side view of the lamp clip.

The lamp clip LC will now be described in detail with reference to FIGS. 1 to 4. FIG. 1 is an enlarged perspective view of the lamp clip LC shown in FIG. 9, and FIG. 2 is a side view of the lamp clip LC. As shown in FIGS. 1 and 2, the lamp clip LC includes a base portion 11, engagement portions 12, clip pieces CP, and a support pin SP.

The base portion 11, on one hand, supports the clip pieces CP and the support pin SP on an obverse face 11F and, on the other hand, suspends the engagement portions 12 from a reverse face 11R. That is, the base portion 11 is a member holding the clip pieces CP, the support pin SP, and the engagement portions 12.

The engagement portions 12 are members that are connected to the reverse face 11R of the base portion 11, and that are for fitting the lamp clip LC itself to the floor face 44B of the backlight chassis 44. Specifically, the engagement portions 12 include a project piece 15 and a catch piece 16.

The project piece 15 is a column piece (note that the shape of the column may be circular or polygonal) with an outer diameter slightly smaller than that of an open hole (not shown) formed in the backlight chassis 44, and projects from the reverse face 11R of the base portion 11. In addition, the project piece 15, by being fitted in the open hole, fixes the lamp clip LC in the in-plane direction of the floor face 44B of the backlight chassis 44.

When the project piece 15 is fitted in the open hole, the reverse face 11R of the base portion 11 makes contact with the floor face 44B of the backlight chassis 44. Thus, preferably, the reverse face 11R of the base portion 11 makes close contact with the floor face 44B of the backlight chassis 44. For example, if the floor face 44B of the backlight chassis 44 has a flat face, the reverse face 11R of the base portion 11 desirably has also a flat face.

The catch piece 16 is formed at a tip of the project piece 15, and is a member that is caught by the rim of the open hole in the backlight chassis 44. Accordingly, the catch piece 16, by being caught by the rim of the open hole, fixes the lamp clip LC in the standing direction (the vertical direction or the like) with respect to the floor face 44B of the backlight chassis 44.

Each of the clip pieces CP is a member that is located at the obverse face 11F of the base portion 11 and grasps a side face of a bar-shaped (cylindrical or the like) fluorescent tube 42. Thus, in a case where a fluorescent tube 42 with a cylindrical shape and the like is grasped, the clip piece CP has a cylindrical-tube shape with a slit ST provided in a side face thereof. Since the clip piece CP grasps the fluorescent tube 42, the clip piece CP has an inner diameter slightly larger than the outer diameter of the fluorescent tube 42.

The clip piece CP includes end parts of the slit ST, namely overhang parts AP and AP. The overhang parts AP and AP stretch out with distance from the center IC of the inner diameter of the clip piece CP. Thus, the clearance (between overhang parts AP and AP) of the slit ST increases with distance from the center IC of the inner diameter of the clip piece CP.

Such overhang parts AP and AP are formed of resin and thus has elastic force. Then, when the fluorescent tube 42 is aligned with the slit ST and pressed down, the overhang parts AP and AP separate from one another attributable to their elastic force. As a result, the fluorescent tube 42 is fitted into the clip piece CP easily.

After the fluorescent tube 42 is fitted into the clip piece CP, the overhang parts AP and AP that have the clearance of the slit ST increased restore to their original states (normal states where the fluorescent tube 42 is not sandwiched) attributable to their elastic force. Then, the overhang parts AP and AP approach one another to press the fluorescent tube 42. As a result, the fluorescent tube 42 does not fall off from the clip piece CP but is stably grasped.

The support pin SP is a helical-shaped elastic member (a helical elastic member), and stands on the obverse face 11F of the base portion 11. Thus, the support pin SP stands up with respect to the floor face 44B of the backlight chassis 44, so that it is in contact with, so as to support, the diffusion sheet 46 that is laid over the floor face 44B.

Figure 3:
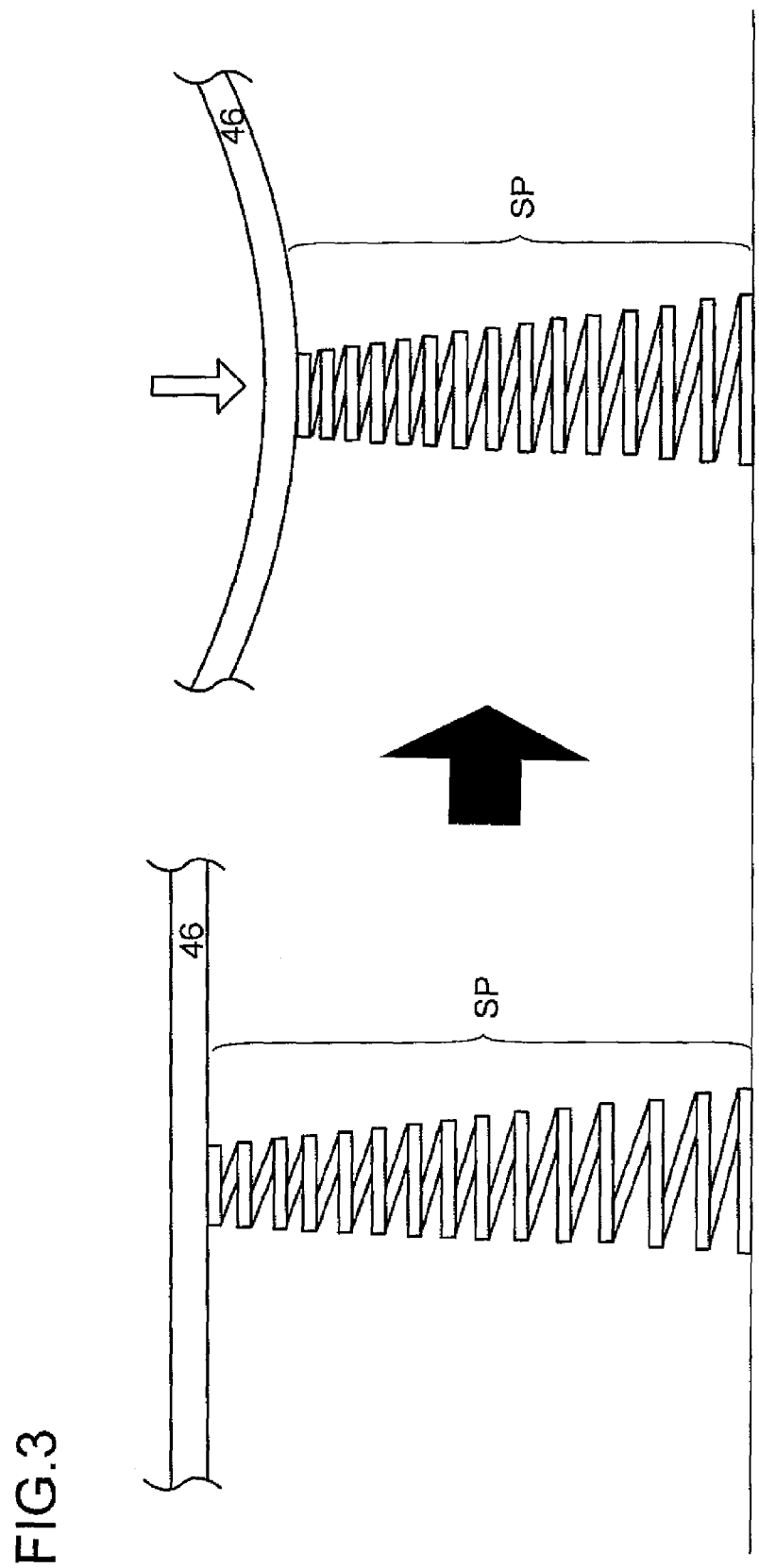
[FIG. 3] A side view to show: a support pin of the lamp clip that supports an unbent optical sheet; and a support pin of the lamp clip that supports a bent optical sheet.

To be specific, generally, as shown in a left part of FIG. 3, the support pin SP supports the diffusion sheet 46 that is unbent and maintained flat. The diffusion sheet 46, however, bends (warps) in various directions under influence of heat generated by shining fluorescent tubes 42. For example, when the reverse face of the diffusion sheet 46—which is closer to the fluorescent tube 42—is stretched by the heat, and on the other hand the obverse face contracts, a part of the diffusion sheet 46 at or near the center thereof bends, as shown in a right part of FIG. 3, so as to sag toward the support pin SP (see a white arrow).

Then, the support pin SP is pressed down by the sagging diffusion sheet 46 and thus contracts. The contraction state of the support pin SP is maintained if the diffusion sheet 46 keeps bending so as to sag. However, when the fluorescent tube 42 is extinguished, there is no influence of the heat, and thus the diffusion sheet 46 tends to restore to its original state (the flat state).

When the diffusion sheet 46 tends to restore to its original state, the force from above that has acted on the tip of the support pin SP is gradually decreased. Then, the support pin SP that has contracted also tends to restore to its original state. In the course of restoring, the support pin SP formed of a helical elastic member, with its flexibility, tends to restore while keeping close contact with the diffusion sheet 46. That is, the support pin SP does not separate from the diffusion sheet 46. Thus, no such situations occur as the support pin SP and the diffusion sheet 46 once separate, and then collide with each other to generate noise.

Figure 4:
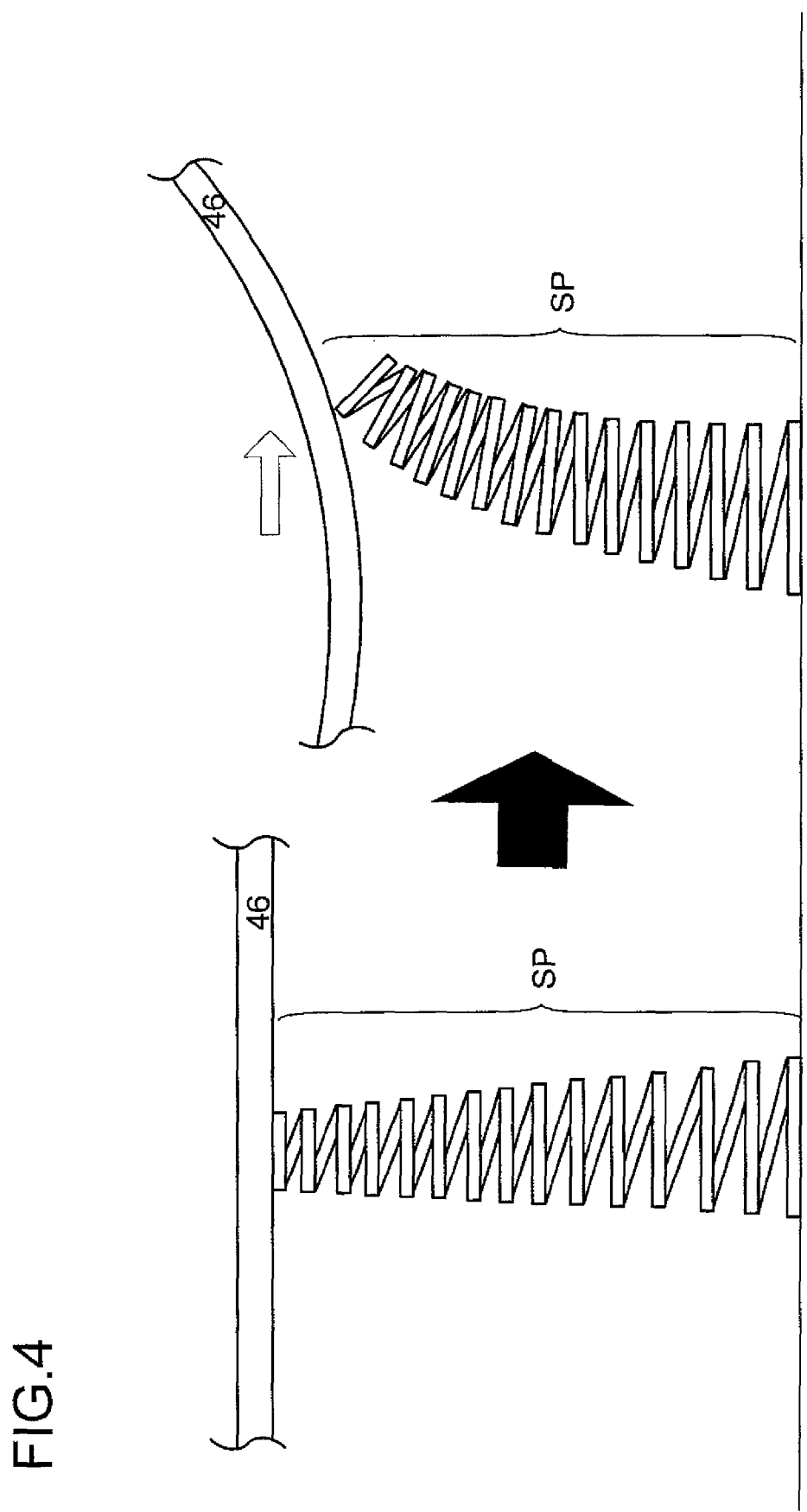
[FIG. 4] A diagram which is another example of FIG. 3, and is a side view to show: a support pin of the lamp clip that supports an unbent optical sheet; and a support pin of the lamp clip that supports a bent optical sheet.

As shown in a right part of FIG. 4 (a left part of FIG. 4 is similar to the left part of FIG. 3), at a part other than the center of the diffusion sheet 46 (for example, near an end thereof), the diffusion sheet 46 bends (see a white arrow) so as to push over the support pin SP from a side thereof (in short, the circumference of the support pin SP).

Then, the support pin SP is pressed down by the diffusion sheet 46 that is bent so as to push over, and tilts. The tilted state of the support pin SP is maintained if the diffusion sheet 46 keeps bending so as to push over; however, when the fluorescent tube 42 is extinguished and there is no influence of heat, the diffusion sheet 46 tends to restore to its original state (the flat state).

When the diffusion sheet 46 tends to restore to its original state, the force that has acted on the tip of the support pin SP from the side thereof gradually decreases. Then, the tilted support pin SP tends to restore to its original state. In the course of restoring, the support pin SP tends to restore to its original state while keeping close contact with the diffusion sheet 46. Thus, the support pin SP does not separate from the diffusion sheet 46, and thus no such situations occur as the support pin SP and the diffusion sheet 46 once separate, and then collide with each other to generate noise.

The support pin SP is formed of a helical elastic member having a relatively high flexibility. Thus, even when the diffusion sheet 46 presses down the support pin SP (makes it contract) or pushes over the support pin SP, squeaking noise (generated noise) is less likely to be generated from the support pin SP itself.

The restoration of the diffusion sheet 46 to a flat face state (the original state) is not limited to a case where the fluorescent tube 42 is extinguished. For example, if the internal temperature of the backlight unit 49 rises and the diffusion sheet 46 has kept bending to sag because the fluorescent tube 42 stayed on, the support pin SP cannot endure it and thus reacts to restore the diffusion sheet 46 to its original state.

In other words, the support pin SP pushes back the diffusion sheet 46 by its reaction force. Even in this case, the support pin SP does not separate from the diffusion sheet 46. Accordingly, no such situations occur as the support pin SP and the diffusion sheet 46 once separate, and then collide with each other to generate noise.

Incidentally, the support pin SP formed of a helical elastic member is increasingly narrow toward the tip (is tapered). To be specific, the support pin SP is conical. Thus, the area of the support pin SP that makes contact with the diffusion sheet 46 directly is small and, moreover, the width direction dimension of the support pin SP reflected due to being close to the diffusion sheet 46 is small. The support pin SP is therefore hard to be recognized visually from outside.

[Other Embodiments]

It should be understood that the present invention may be carried out in any manner other than specifically described above as an embodiment, and many modifications a variations are possible within the scope and spirit of the present invention.

Figure 5:
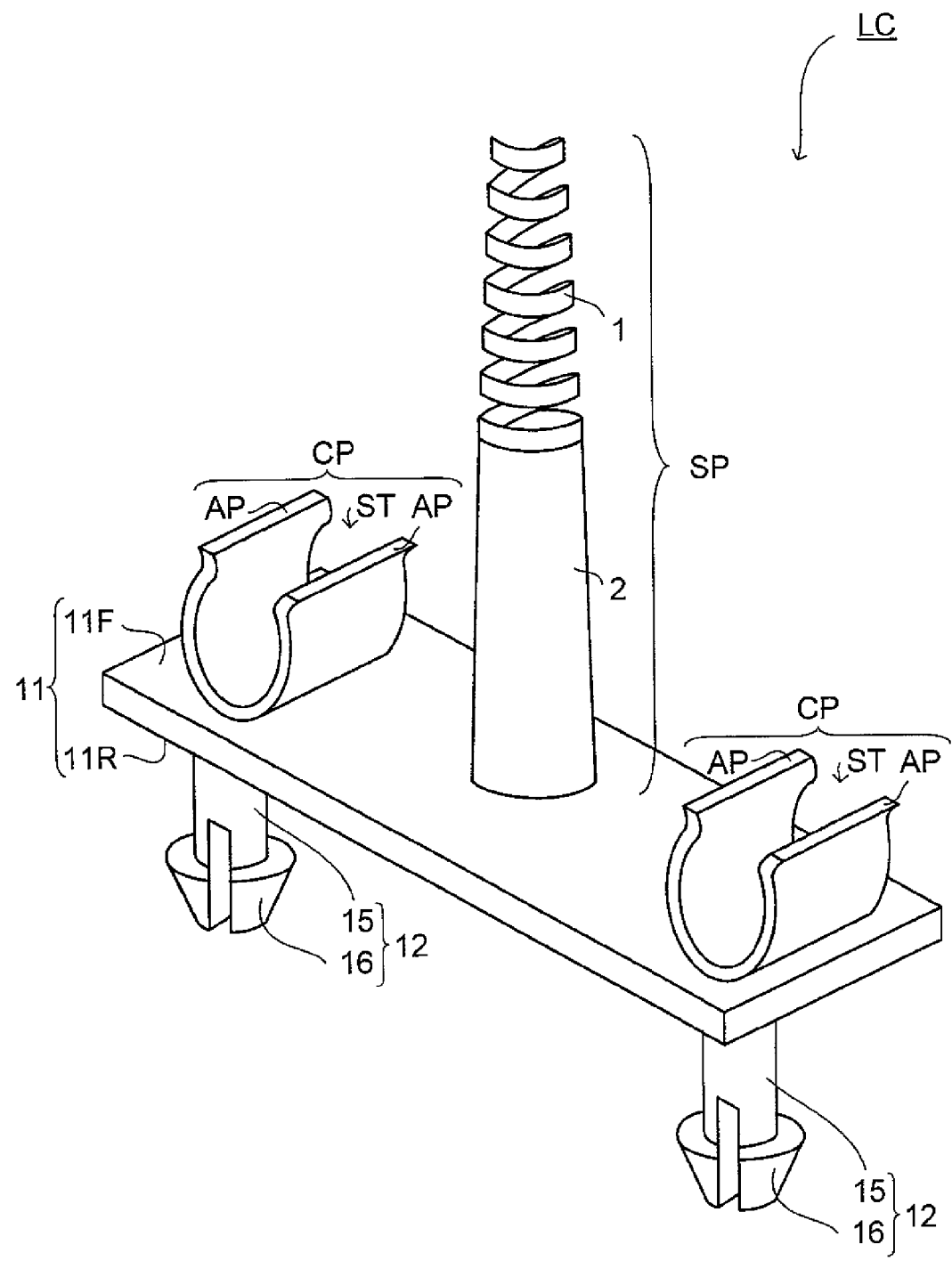
[FIG. 5] A diagram which is another example of FIG. 1, and is a perspective view of a lamp clip provided with a support pin that includes a helical elastic member and a hold piece.

For example, in the first embodiment, the entire support pin SP of the lamp clip LC is formed of the helical elastic member. This, however, is not meant to be any limitation. For example, as shown in FIG. 5, the support pin SP may be formed of a helical elastic member 1 and a hold piece 2 that supports it. To be specific, the support pin SP may have the helical elastic member 1 arranged in a front-end part thereof, and have the hold piece 2 arranged in a rear-end part thereof.

This also allows the diffusion sheet 46 to be in contact with the helical elastic member 1 with flexibility. Thus, as in the case of the first embodiment, in the course where the support pin SP that has contracted, tilted, and the like due to the bent diffusion sheet 46 tends to restore to its original state, the helical elastic member 1 of the support pin SP, with its flexibility, tends to restore while keeping contact with the diffusion sheet 46. Thus, the helical elastic member 1 does not separate from the diffusion sheet 46, and thus no such situations occur as the helical elastic member 1 and the diffusion sheet 46 once separate, and then collide with each other to generate noise.

Moreover, even when the diffusion sheet 46 presses down or pushes over the helical elastic member 1 in the front-end part of the support pin SP, squeaking noise is less likely to be generated from the helical elastic member 1 itself (in short, benefits similar to those in the first embodiment are achieved).

Even in the support pin SP in which the helical elastic member 1 is arranged in the front end part thereof, the helical elastic member 1 may be increasingly narrow toward the tip. This makes the helical elastic member 1 hard to be recognized visually from outside.

Moreover, the entire support pin SP including the helical elastic member 1 and the hold piece 2 may be, as a whole, increasingly narrow toward the tip. This makes the width direction dimension of the support pin SP that is reflected due to being close to the diffusion sheet 46 small, and thus makes the support pin SP hard to be recognized visually from outside.

Figure 6:
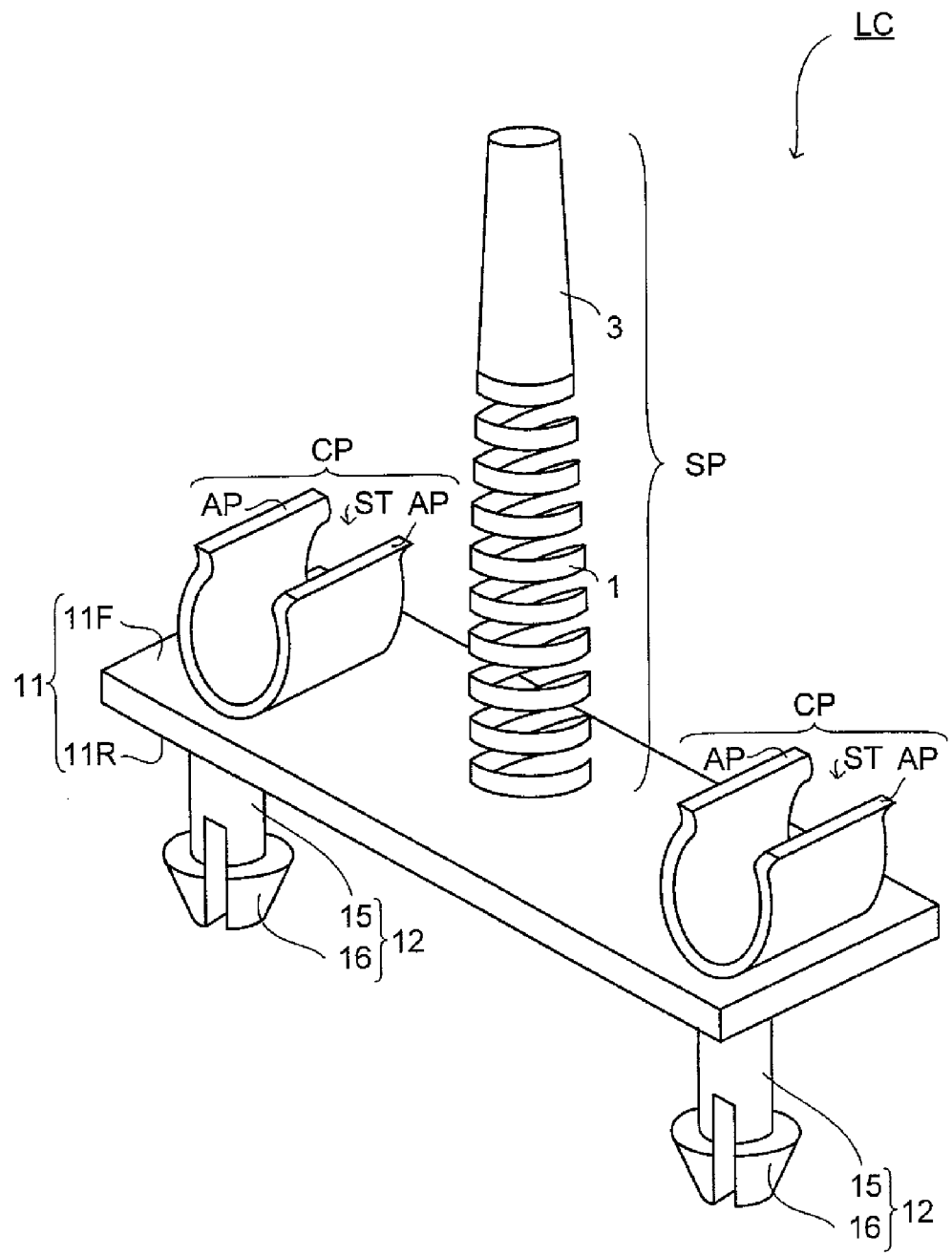
[FIG. 6] A diagram which is another example of FIGS. 1 and 5, and is a perspective view of a lamp clip provided with a support pin that includes a contact piece and a helical elastic member.

The position of the helical elastic member 1 in the support pin SP is not limited to the front end part. For example, as shown in FIG. 6, the support pin SP may have the helical elastic member 1 arranged in a rear-end part thereof and, by the helical elastic member 1, a contact piece 3 that keeps contact with the diffusion sheet 46 may be supported. That is, the support pin SP may have the helical elastic member 1 arranged in the rear-end part thereof, and have the contact piece 3 arranged in a front-end part thereof.

Figure 7:
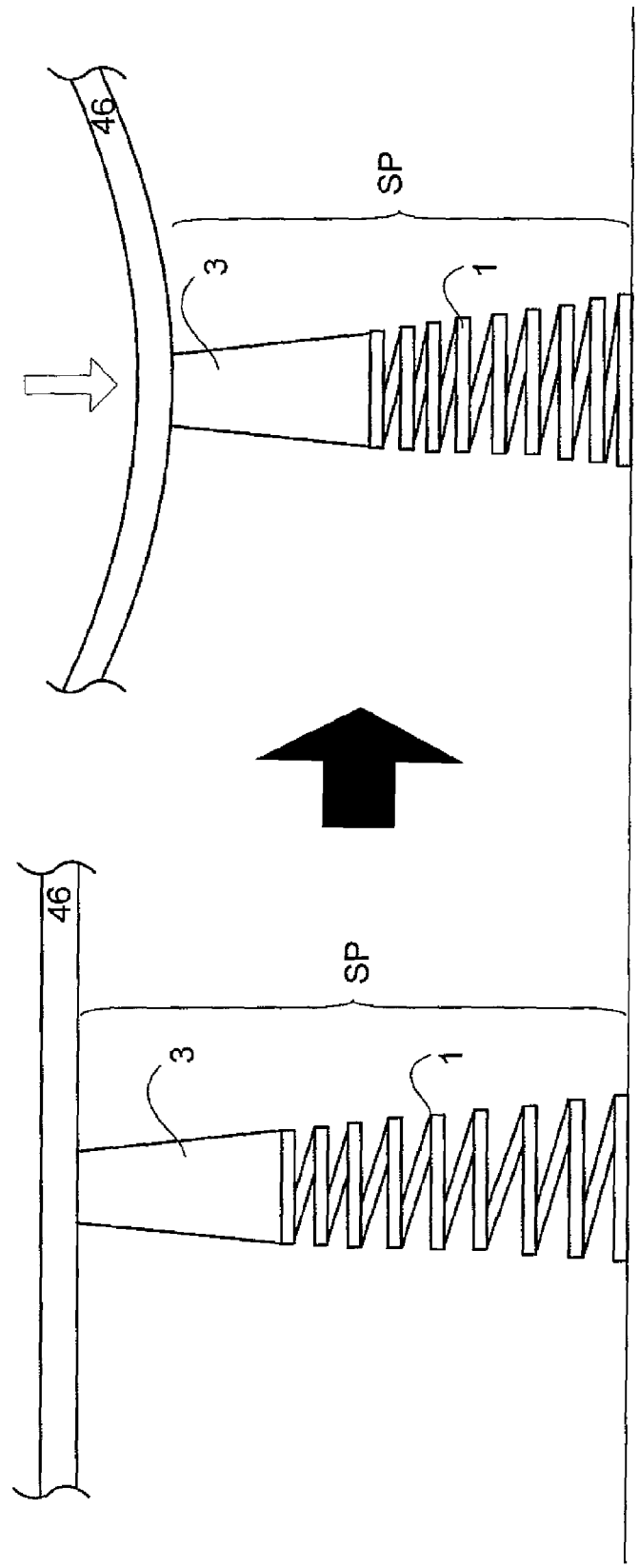
[FIG. 7] A side view to show: a support pin of the lamp clip shown in FIG. 6 that supports an unbent optical sheet; and a support pin of the lamp clip shown in FIG. 6 that supports a bent optical sheet.

With this design, as shown in a left part of FIG. 7, the diffusion sheet 46 that is unbent and maintained flat is supported by the contact piece 3 of the support pin SP. In addition, as shown in a right part of FIG. 7, at or near the center of the diffusion sheet 46, the contact piece 3 is pressed down by the sagging diffusion sheet 46 and, as being so pressed down, the helical elastic member 1 contracts.

When the diffusion sheet 46 tends to restore to its original state, the force from above that has acted on the contact piece 3 (and in turn on the helical elastic member 1) gradually decreases. Then, the contracted helical elastic member 1 tends to restore to its original state. In the course of restoring, the contact piece 3, with the flexibility of the helical elastic member 1, tends to restore while keeping contact with the diffusion sheet 46. Thus, no such situations occur as the contact piece 3 of the support pin SP and the diffusion sheet 46 once separate, and then collide with each other to generate noise.

Figure 8:
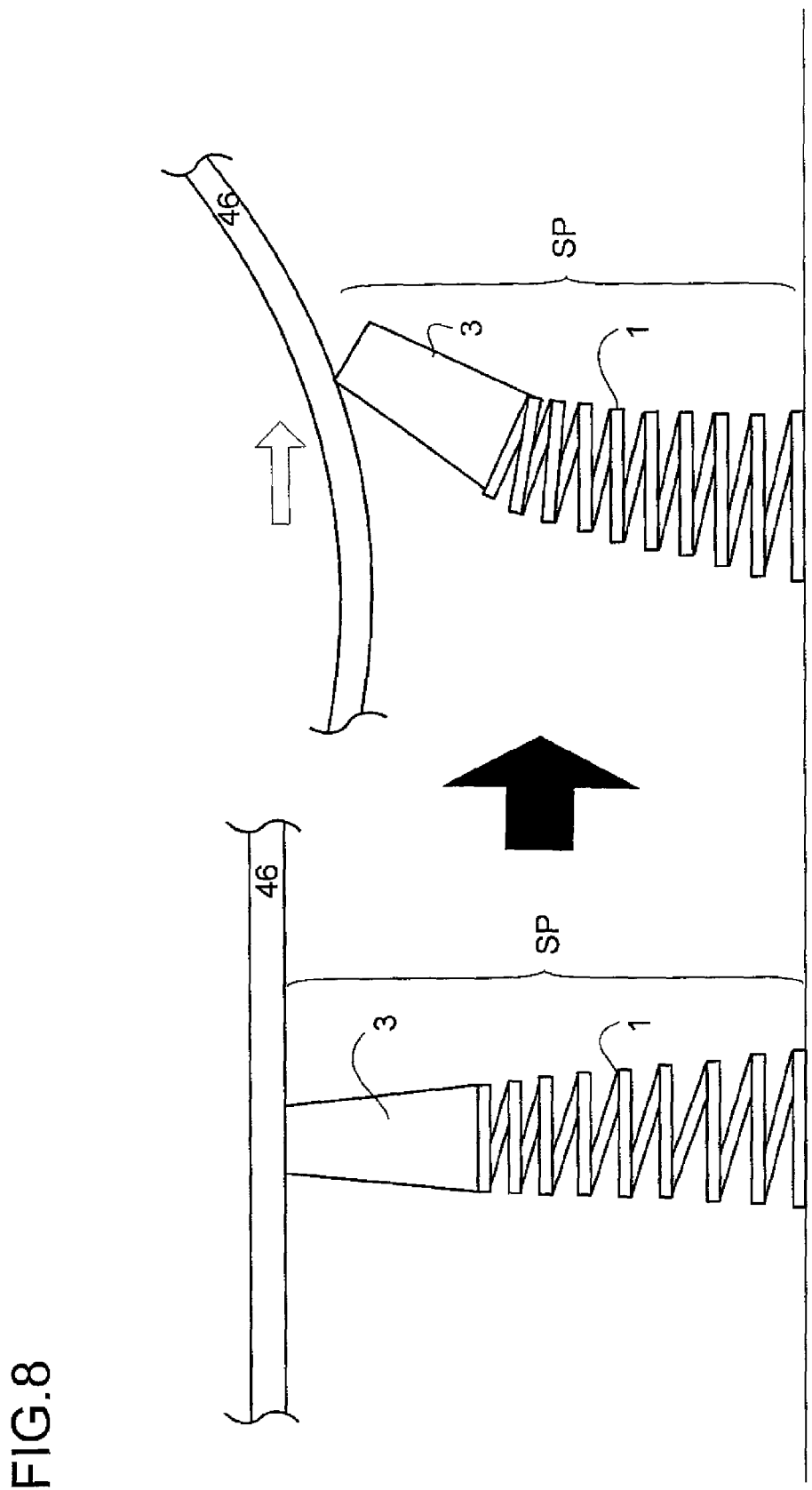
[FIG. 8] A diagram which is another example of FIG. 7, and is a side view to show: a support pin of the lamp clip shown in FIG. 6 that supports an unbent optical sheet; and a support pin of the lamp clip shown in FIG. 6 that supports a bent optical sheet.

Moreover, as shown in a right part of FIG. 8 (a left part of FIG. 8 is similar to the right part of FIG. 7), in a case where the diffusion sheet 46 bends so as to push over the support pin SP (in particular, the contact piece 3) from a side thereof, the force acting on that contact piece 3 is transmitted to the helical elastic member 1, and both the contact piece 3 and the helical elastic member 1 tilt.

Then, when the diffusion sheet 46 tends to restore to its original state, the force that has acted on the contact piece 3 from the side thereof gradually decreases. Then, the tilted helical elastic member 1 tends to restore to its original state. In the course of restoring, the contact piece 3, with the flexibility of the helical elastic member 1, tends to restore while keeping contact with the diffusion sheet 46. Thus, no such situations occur as the contact piece 3 of the support pin SP and the diffusion sheet 46 once separate, and then collide with each other to generate noise.

Even in a case where the diffusion sheet 46 presses down or pushes over the contact piece 3 in the front-end part of the support pin SP, the contact piece 3 itself does not bend but the helical elastic member 1 bends. Thus, squeaking noise is less likely to be generated from the support pin SP itself.

Also in such a support pin SP in which the contact piece 3 is arranged in the front-end part thereof, preferably, the contact piece 3 is increasingly narrow toward the tip. This makes the contact piece 3 hard to be recognized visually from outside.

Moreover, the entire support pin SP including the contact piece 3 and the helical elastic member 1 may be, as a whole, increasingly narrow toward the tip. This makes the width direction dimension of the support pin SP that is reflected due to being close to the diffusion sheet 46 small, and thus makes the support pin SP hard to be recognized visually from outside.

Based on the above description, in short, the support pin SP may have the entire part thereof formed of the helical elastic member 1, or have the helical elastic member 1 included in at least a part thereof. In the above description, the support pin SP is a member included in the lamp clip LC. However, if the fluorescent tube 42 is stably held by the lamp holders 43, the clip pieces CP may not be included, and the base portion 11, the engagement portions 12, and a member (a supporting unit) that includes the support pin SP may be fitted to the floor face 44B of the backlight chassis 44.

The material of the lamp clip LC is not particularly limited; desirably, it is a white resin. This allows the light that strikes the lamp clip LC to be reflected, and thus makes the lamp clip LC itself hard to be recognized visually from outside through the diffusion sheet 46.

The position of the lamp clip LC is not particularly limited. Specifically, the lamp clip LC may be so located as to correspond to at or near the center of the diffusion sheet 46, or be so located as to correspond to a part other than at or near the center thereof. However, if the lamp clip LC is so located as to correspond to a place (such as at or near the center) in the diffusion sheet 46 where it is most likely to bend, generation of noise is suppressed effectively.

In the above description, as examples of the optical sheet, the diffusion sheet 46 and the lens sheet 47 are taken up. This, however, is not meant to be any limitation. In short, any sheet will do as long as it transmits light.

The invention claimed is:

1. A supporting unit supporting an optical sheet that refracts and advances received light to emit, comprising a support pin that is in contact with and thereby supports the optical sheet,
   wherein, a front-end portion of the support pin is defined by a helical elastic member; and
   the helical elastic member increasingly becomes narrow toward a tip thereof.

2. The supporting unit according to claim 1,
   wherein the support pin becomes increasingly narrow from a base toward the tip.

3. The supporting unit according to claim 1,
   wherein a clip piece grasping a linear light source that emits light is included.

4. The supporting unit according to claim 1,
   wherein the supporting unit is formed of a white resin.

5. An illuminating unit comprising:
   a linear light source;
   an optical sheet receiving light from the linear light source and then refracting and advancing the light to emit; and
   the supporting unit according to claim 1 that supports the optical sheet.

6. A display device comprising the illuminating unit according to claim 5.

7. A supporting unit supporting an optical sheet that refracts and advances received light to emit, comprising a support pin that is in contact with and thereby supports the optical sheet,
   wherein in at least a part of the support pin, a helical elastic member is included,
   the helical elastic member is located in a front-end part of the support pin, and
   in a rear-end part of the support pin, a hold piece supporting the helical elastic member is located.

8. The supporting unit according to claim 7,
   wherein the helical elastic member is increasingly narrow toward a tip.

9. The supporting unit according to claim 7,
   wherein the support pin including the helical elastic member and the hold piece is, as a whole, increasingly narrow toward a tip.

* * * * *